United States Patent [19]

Martinson

[11] Patent Number: 4,722,314

[45] Date of Patent: Feb. 2, 1988

[54] FUEL HEATER

[75] Inventor: Daniel B. Martinson, St. Francis, Minn.

[73] Assignee: Northwest Investments, Crookston, Minn. ; a part interest

[21] Appl. No.: 881,445

[22] Filed: Jul. 2, 1986

[51] Int. Cl.$^4$ ........................................... F02M 31/00
[52] U.S. Cl. ................................................ 123/557
[58] Field of Search ....................................... 123/557

[56] References Cited

U.S. PATENT DOCUMENTS

| | | | |
|---|---|---|---|
| 1,318,068 | 10/1919 | Giesler | 123/557 |
| 1,368,186 | 2/1921 | Morgan | 123/557 |
| 1,623,074 | 4/1927 | Tartrais | 123/557 |
| 2,698,055 | 12/1954 | Williams | 123/557 |
| 2,719,518 | 10/1955 | Newman | 123/557 |
| 2,748,758 | 6/1956 | Fairbanks | 123/557 |
| 2,896,658 | 7/1959 | Jones | 123/557 |
| 2,988,075 | 6/1961 | Ensign | 123/557 |
| 3,378,063 | 4/1968 | Mefford | 123/557 |
| 3,762,385 | 10/1973 | Hollnagel | 123/557 |
| 3,841,284 | 10/1974 | Krygowski | 123/557 |
| 3,951,124 | 4/1976 | Fairbanks et al. | 123/557 |
| 3,989,019 | 11/1976 | Brandt et al. | 123/557 |
| 4,044,742 | 8/1977 | Linder | 123/557 |
| 4,083,340 | 4/1978 | Furr et al. | 123/557 |
| 4,338,907 | 7/1982 | Lindbeck | 123/557 |
| 4,367,717 | 1/1983 | Ray | 123/557 |
| 4,434,773 | 3/1984 | Granetzke | 123/557 |
| 4,519,358 | 5/1985 | Redele | 123/557 |
| 4,527,533 | 7/1985 | Laramee | 123/557 |
| 4,539,965 | 9/1985 | Soltan | 123/557 |
| 4,629,560 | 12/1986 | Harris | 123/557 |

OTHER PUBLICATIONS

"Thermostatic Actuators", Robertshaw Controls Company brochure.

Primary Examiner—Ronald B. Cox
Attorney, Agent, or Firm—Burd, Bartz & Gutenkauf

[57] ABSTRACT

An apparatus for heating liquid fuel for an internal combustion engine has a heat exchanger equipped with a fileter for removing vapors generated during the heating of the fuel in the heat exchanger. The controller has a finger movable into a passage with a temperature responsive actuator. The hot fuel from the heat exchanger heats the temperature responsive actuator to control the flow of heating fluid to the heat exchanger.

23 Claims, 8 Drawing Figures

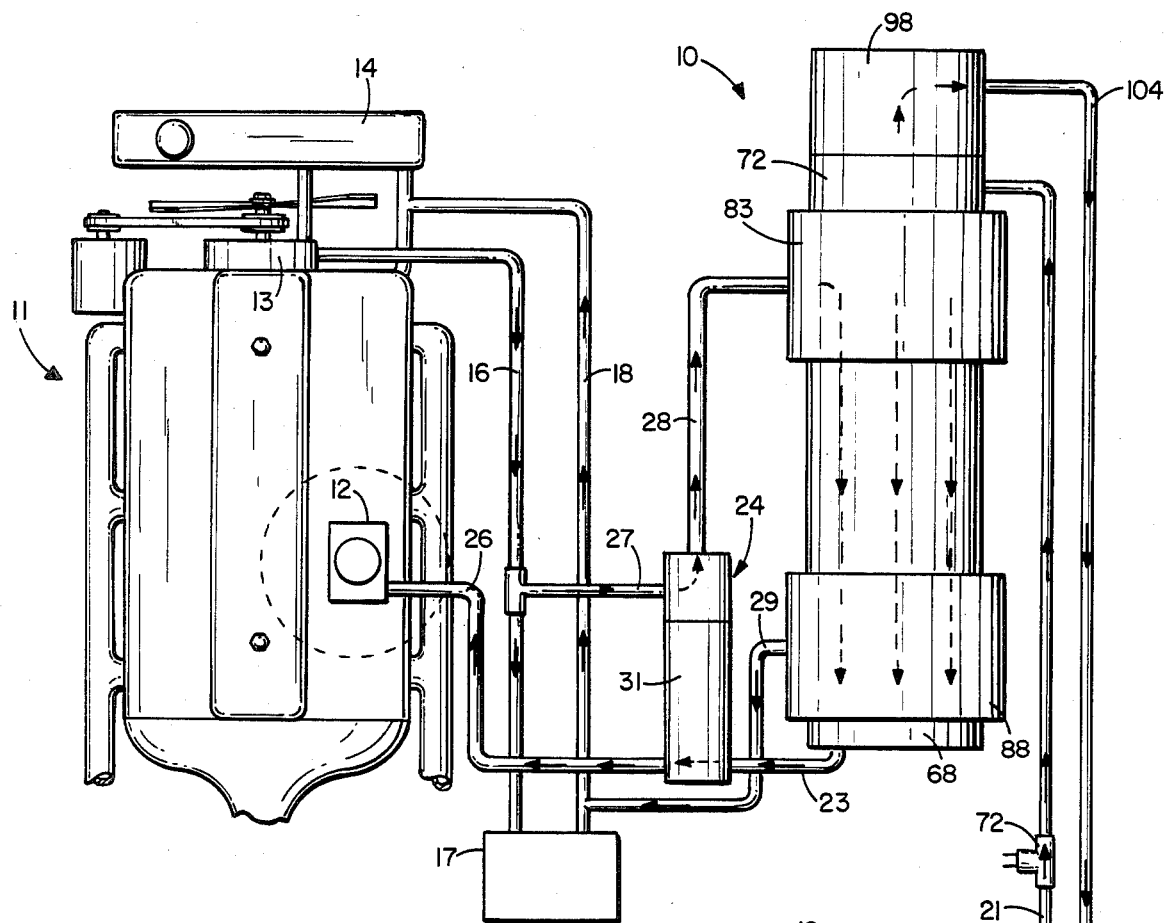
FIG. 1
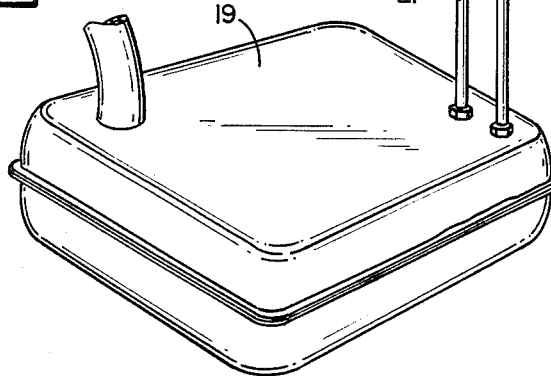
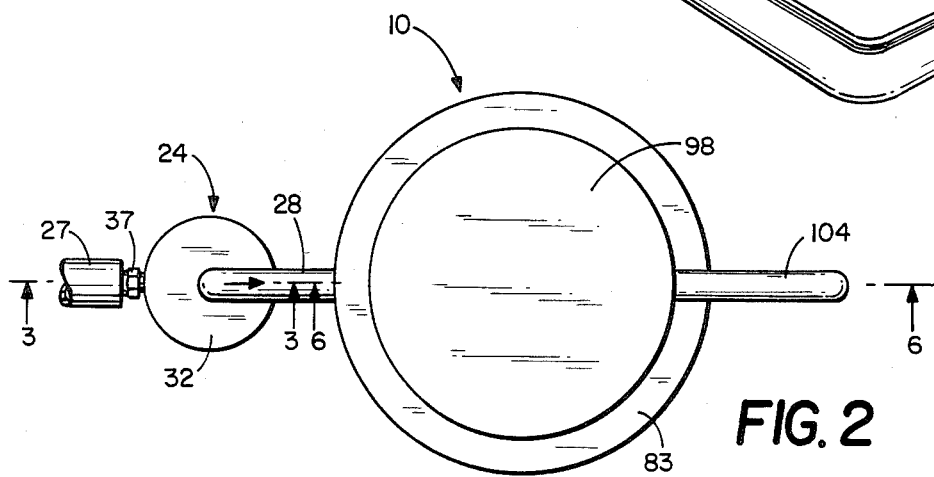
FIG. 2

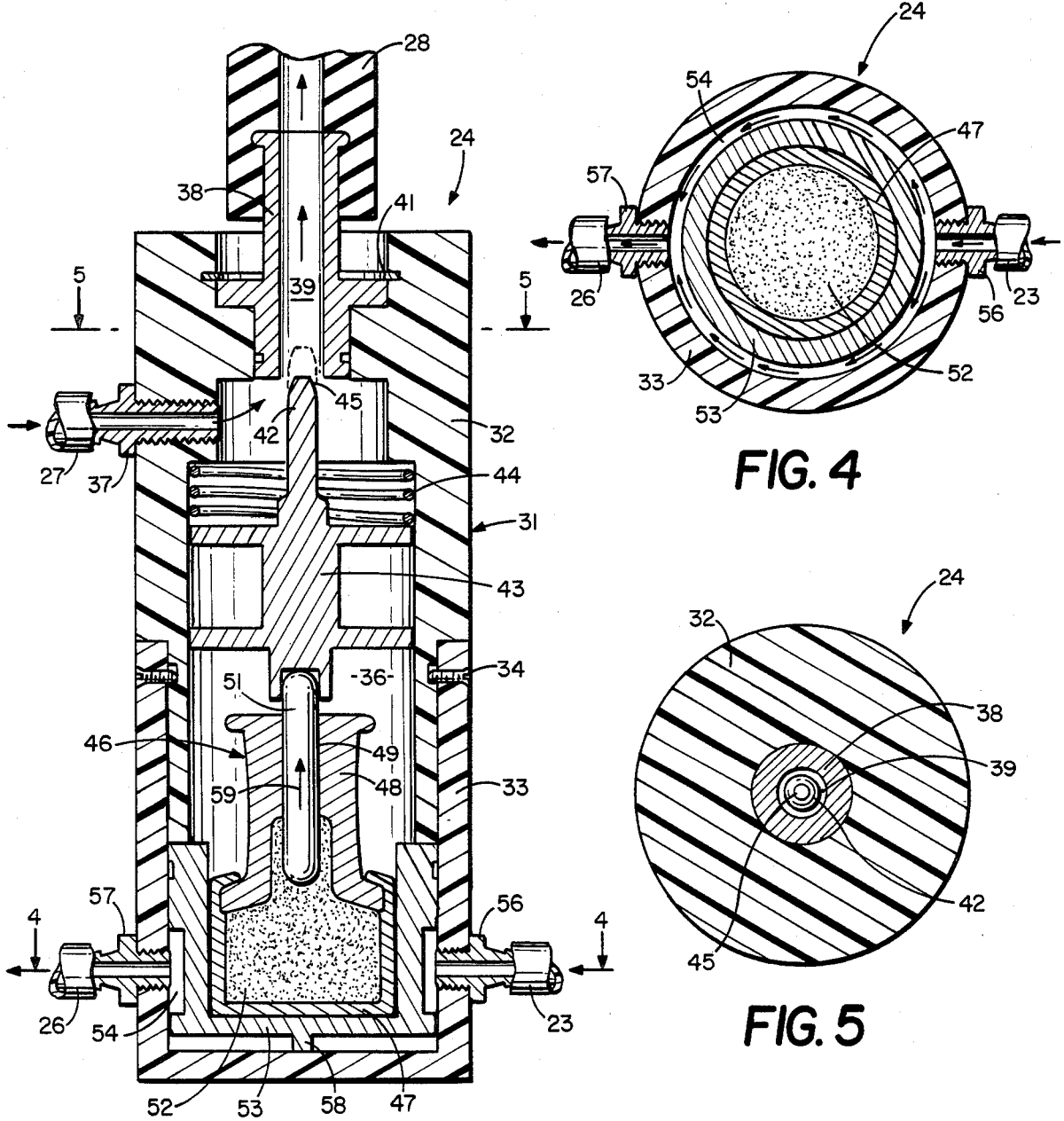

FUEL HEATER

FIELD OF INVENTION

The field of the invention is fuel heating systems for internal combustion engines. The fuel heating system utilizes heat from the coolant of the engine to raise the temperature of the fuel that is supplied to the carburetor or fuel injectors of the engines.

BACKGROUND OF INVENTION

Numerous structures have been proposed to preheat hydrocarbon liquid fuel prior to its delivery to a carburetor for an internal combustion engine. Hot exhaust gases and the hot coolants for the engines have been used to preheat the fuel. When the hydrocarbon fuel is heated, it tends to vaporize with the result that vapors along with liquid fuel is delivered to the carburetor. This makes it difficult to control the temperature of the liquid fuel and will starve the carburetor of liquid fuel. This results in engine inefficiency and stalling due to vapor lock. The prior art fuel preheaters are unable to compensate for temperature variations in the heat exchanger and the formation and extraction of fuel vapors from the heat exchanger so that only heated liquid fuel is supplied to the engine.

SUMMARY OF INVENTION

The invention is directed to an apparatus for heating liquid fuel prior to mixing with air and combustion thereof in a combustion apparatus, such as an internal combustion engine, heater or the like. The combustion apparatus utilizes a cooling fluid to control its temperature. The cooling fluid is used as the heat source to heat the liquid fuel. The apparatus heats liquid fuel for an internal combustion engine to a substantially constant temperature. This promotes fuel economy as the carburetor of the engine operates to produce a substantially uniform air-to-fuel mixture. The warm fuel also is efficiently atomized with fuel injectors of internal combustion engines. Vapors generated during the heating of the fuel are removed from the apparatus so as to avoid the problem of vapor lock.

The apparatus has a fuel heater comprising a housing having a first chamber for accommodating hot fluid from the cooling system of the engine. A controller operable in response to the temperature of the fuel leaving the heater is operable to control the flow of the hot fluid through the housing. This regulates the temperature of the fluid moving through the housing and maintains a substantially uniform heating of the liquid fuel. The housing has a wall that separates first and second chambers so that hot fluid in the first chamber effectively heats the fuel in the second chamber. The wall surrounds a non-heat conductive core that confines the fuel to the vicinity of the wall. The core does not function as a heat sink. This provides for an efficient and effective transfer of heat from the fluid to the liquid fuel without being materially affected by the metal of the housing and the external air temperature.

The housing has a top member that closes the second chamber. A cap mounted on the top member forms a third chamber for accumulating vapors that are generated during the heating of the fuel. The top member has passages for allowing the vapors to flow from the second chamber into the third chamber. A filter mounted on the cap is open to the third chamber and externally of the cap so that the vapors flow through the filter and externally of the cap. Preferably, the vapors are vented back to the fuel tank. The liquid fuel remains in the heater. The vapors do not flow to the engine and thereby eliminates vapor lock problems.

The controller has a housing of non-heat conductive material providing a chamber for the fluid from the cooling system of the engine. A tubular connector having a passage joins the chamber to the heater. A finger member movable in the chamber is locatable relative to the passage to restrict the flow of fluid through the passage and thereby regulate the flow of fluid through the heater. This controls the temperature of the fuel being heated in the heater. A temperature responsive actuator located within the housing is connected to the finger member. The actuator is operable to move the finger member relative to the passage in response to the temperature of the fuel moving from the heater to the engine. The hot fuel flows adjacent the temperature responsive actuator so that the actuator senses the temperature of the fuel to regulate the position of the finger relative to the passage. The temperature of the fuel is automatically regulated. External adjustments are not required to insure the selected range of the temperature of the fuel being supplied to the engine. These and other advantages of the fuel heater and controller of the invention are embodied in the detailed structure shown and described in the following specification.

DESCRIPTION OF DRAWING

FIG. 1 is a diagrammatic view of an internal combustion engine connected to the fuel heater of the invention;

FIG. 2 is an enlarged top view of the fuel heater of FIG. 1;

FIG. 3 is an enlarged sectional view taken along the line 3—3 of FIG. 2;

FIG. 4 is a sectional view taken along the line 4—4 of FIG. 3;

FIG. 5 is a sectional view taken along the line 5—5 of FIG. 3;

DESCRIPTION OF PREFERRED EMBODIMENT

Figure 6:
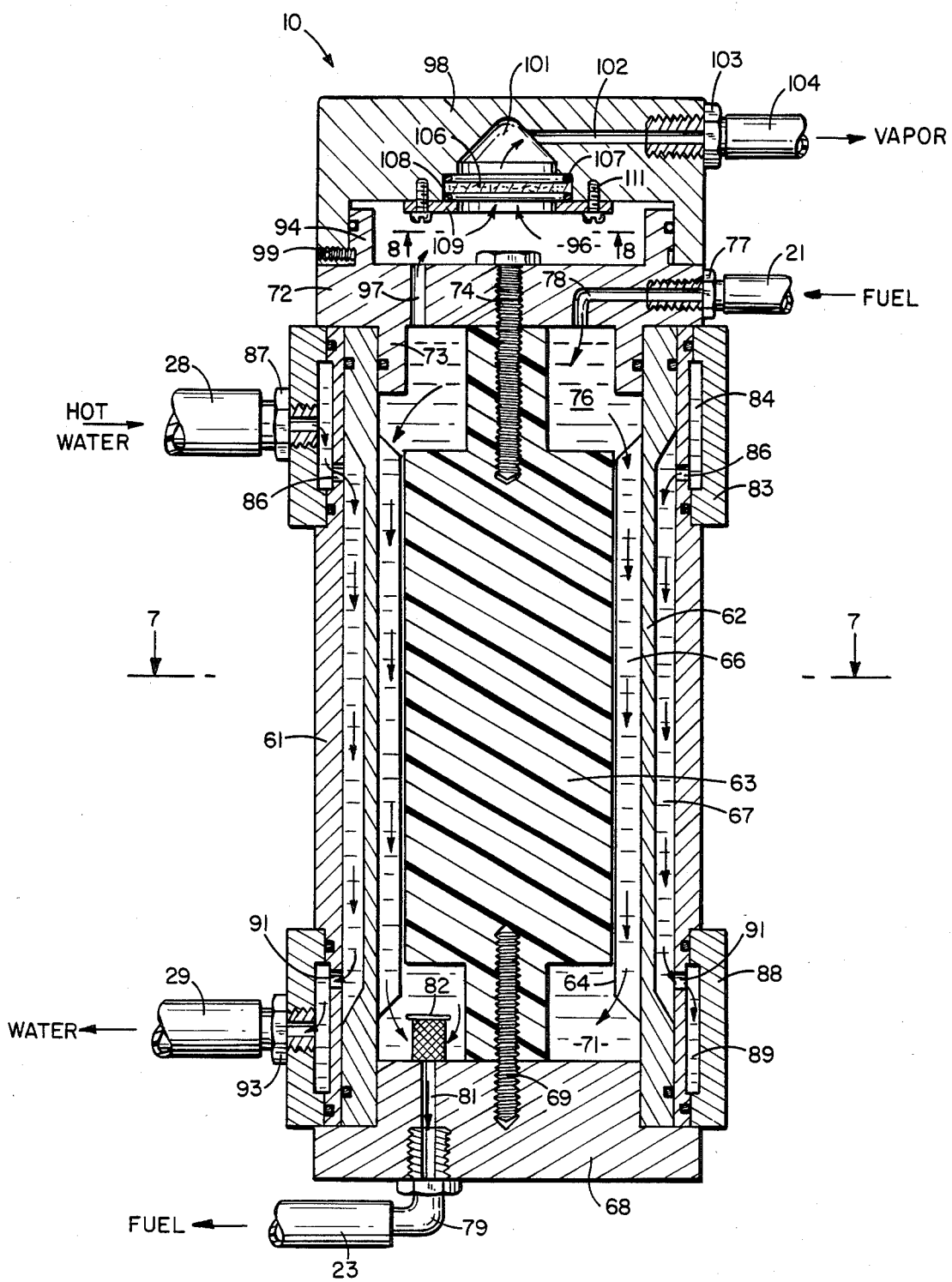
FIG. 6 is an enlarged sectional view taken along the line 6—6 of FIG. 2.

Referring to FIG. 1, there is shown a fuel heater of the invention indicated generally at 10 operatively connected to an internal combustion engine 11. Engine 11 is a standard hydrocarbon fuel motor that is used with motor vehicles including trucks, buses, automobiles, and the like. The fuel heater is usable with other combustion structures, such as furnaces and the like. Engine 11 has a carburetor 12 for mixing hydrocarbon fuel, such as gasoline with air to provide a fuel air-mixture that flows through the intake manifold into the combustion chambers of the engine. Engine 11 has pump 13 that operates to circulate cooling fluid or coolant to a radiator 14 to maintain a desired operating temperature of the engine. A hose 16 connects pump 13 with the passenger compartment heater 17. The fluid from heater 17 is returned to radiator 14 via a hose 18. Other hose arrangements can be used to circulate the cooling fluid through engine 11, heater 17 and radiator 14.

Hydrocarbon liquid fuel, such as gasoline, is normally stored in a fuel tank 19. A fuel line 21 is used to carry the liquid fuel from tank 19 to fuel heater 10. A pump 22 operates to provide a continuous supply of fuel to fuel heater 10 and carburetor 12.

A fluid flow controller, indicated generally at 24, operates to control the flow of heated cooling fluid to fuel heater 19 and thereby regulate the temperature of the fuel being supplied to carburetor 12. A line 26 connects controller 24 to carburetor 12. Line 23 connects fuel heater 10 with controller 24 whereby when pump 22 operates a continuous flow of fuel moves through controller 24 to carburetor 12.

An inlet hose 27 connects heater hose 16 to controller 24. An outlet hose 28 connects controller 24 with fuel heater 10. A fluid return hose 29 connects fuel heater 10 to heater hose 18. Water pump 13 functions to continuously circulate heated coolant through controller 24 and fuel heater 10.

As shown in FIGS. 3 and 4, controller 24 has a housing, indicated generally at 31, comprising an upper casing 32 connected to a lower casing 33. A plurality of fasteners 34, such as screws, interconnect the upper and lower casings. Housing 31 has an internal chamber 36. A coolant inlet connector 37 is mounted on upper casing 32 for carrying coolant to chamber 36. An outlet connector 38 is mounted on the upper end of casing 32. Hose 28 is connected to connector 38. Connector 38 has a linear passage 39 for carrying coolant from chamber 36 into hose 28. A snap ring 41 retains connector 38 on casing 32.

A flow control member or finger 42 located in chamber 32 unctions to regulate the rate of flow of coolant through passage 39. The rate of flow of coolant through passage 39 is dependent on the temperature of the fuel that moves through controller 24. Finger 42 is secured to a body 43 linearly movable in chamber 36. A spring 44 located between body 43 and casing 32 biases body 43 and finger 42 away from passage 39 as shown in full lines in FIG. 3. Spring 44 may be eliminated as the pressure of the fluid in the cooling system of the engine is sufficient to move finger 42 to the open position away from passage 39. The position of finger 42 relative to passage 39 is controlled by a thermostatic actuator indicated generally at 46. This actuator is a commercial product sold by Robertshaw Controls Company, Knoxville, Tenn. Actuator 46 has a copper casing 47 joined to a cap 48 having a passage 49. A linearly movable piston 51 located in passage 49 engages the bottom of body 43. A metallic powder material 52 located within casing 43 is sensitive to temperature changes to produce volumemetric expansion and contraction of the material. The expansion of material 52 is translated into movement of piston 51 as indicated by the arrow 59. Casing 47 is located within a heat conductive cup 53 having an annular outside groove 54. Cup 53 fits into the bottom of casing 33. A short projection 58 spaces the bottom of cup 53 from the bottom of casing 33 thereby minimizes the transfer of heat to casing 33.

A fuel inlet connector 56 mounted on casing 33 delivers fuel to groove 54. As shown in FIG. 4, the fuel moves around casing 53 in groove 54 and flows out of groove 54 through an outlet connector 57 carrying line 26. The fuel being introduced into groove 54 has been heated in fuel heater 10. The heat is transmitted through cup 53 and casing 47 which causes expansion of material 52. Piston 51 will move body 43 against the biasing force of spring 44. Finger 42 moves up into the passage 39. The diameter of finger 42 is smaller than the diameter of passage 39 so that there is always a continuous flow of coolant through fuel heater 10. The outer end 45 of finger 42 has a converging taper which regulates the flow of the coolant through passage 39 in accordance with the position of finger 42 relative to the inlet of passage 39. The position of finger 42 relative to passage 39 is a function of the temperature of the fluid flowing in groove 54. Connector 38 can be replaced with a connector having a larger passage 39 to provide for an increased flow of coolant fluid through controller 24 and an increase in temperature of the liquid fuel delivered to the engine. Preferably, the temperature of the fuel flowing through controller 24 is between 105 to 120 degrees F.

Figure 7:
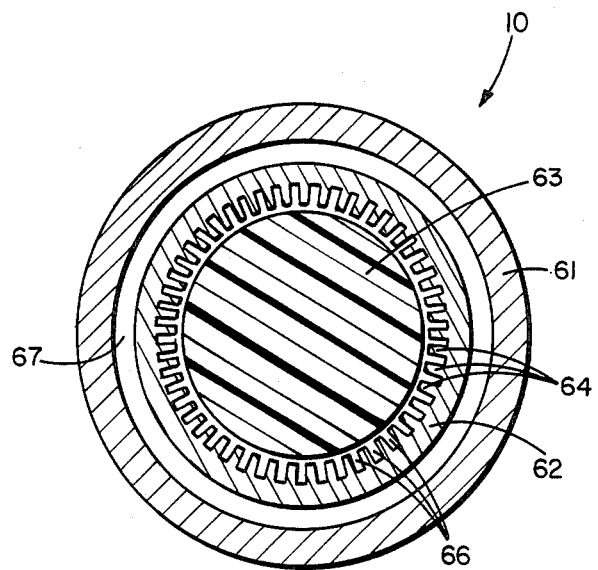
FIG. 7 is a sectional view taken along the line 7—7 of FIG. 6.

Referring to FIG. 6, fuel heater 10 is a heat exchanger having an outer sleeve or cylindrical casing 61 surrounding a heat transfer sleeve 62. Sleeve 62 is a metal member located about a non-heat conductive core 63. Core 63 is a cylindrical plastic member. Other non-heat conductive materials can be used for core 63. As shown in FIG. 7, sleeve 62 has a plurality of circumferentially spaced ribs 64 directed toward the outer surface of core 63. A plurality of longitudinal passages 66 are located between ribs 64. Returning to FIG. 6, casing 61 and sleeve 62 are mounted on a base 68. A screw 69 secures the bottom projection of core 63 to base 68. An annular bottom chamber 71 is located between core 63 and base 68 to receive the heated fuel from passages 66. A top 72 having an annular flange 73 is mounted on top of casing 61 and sleeve 62. A bolt 74 secures top 72 to a top projection of core 63 thereby holding the fuel heater together. Top 72 and core 63 form a top chamber 76 adjacent the inlet end of passages 66. A inlet connector 77 is mounted on top 72 to deliver fuel from line 21 into a passage 78. Passage 78 is open to the top of chamber 76 whereby fuel is continuously supplied to chamber 76. The fuel flows through passages 66 into bottom chamber 71. The temperature of fuel flowing in passages 66 increases by the transfer of heat from sleeve 62. Core 63 being made of nonheat conductive material does not function as a heat sink and thereby ensures effective heating of the liquid fuel. As the fuel is heated it generates vapors which are removed from the heater as hereinafter described. A connector 79 mounted on base 68 receives the fuel from a passage 81 and accommodates line 23 which carries the fuel to controller 24. A filter 82 is mounted on base 68 over passage 81 collects foreign materials in the fuel.

A first collar 83 is mounted on the upper end of casing 61. The collar 93 has an annular groove 84 providing a chamber for hot coolant from controller 24. Casing 61 has a plurality of holes 86 that allow hot coolant to flow from chamber 84 into heat transfer chamber 67 between casing 61 and sleeve 62. A connector 87 threaded into a hole in collar 83 accommodates hose 28 and directs the hot coolant fluid into chamber 84.

A second collar 88 is mounted on the lower end of casing 61. Collar 88 has a annular groove 89 forming a chamber for accommodating coolant. A plurality of holes 91 in casing 61 allow the coolant fluid to flow from the lower portion of chamber 67 into the annular chamber provided by groove 89. A connector 93 mounted on collar 88 accommodates hose 29 which carries the coolant back to the coolant return hose 18 of the engine.

Figure 8:
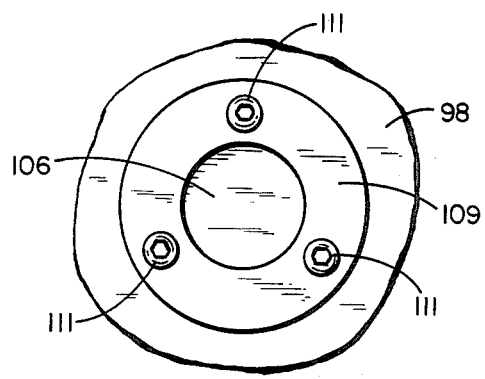
FIG. 8 is an enlarged sectional view taken along the line 8—8 of FIG. 6.

Top 72 has an annular upper lip 94 surrounding a vapor collecting chamber 96. A plurality of passages 97 in top 92 connect the upper end of fuel chamber 76 to chamber 96. A cap 98 mounted on top 72 closes the top of chamber 96. A screw 99 secures cap 98 to upper lip 94. The center of cap 98 has an inside recess 101 open to passage 96. A passage 102 connects recess 101 with a connector 103. A line or tube 104 on connector 103 leads back to fuel tank 19 as shown in FIG. 1. Recess 101 has a outwardly stepped portion accommodating a disc filter 106. Disc filter 106 is of a material, such as porous metal, ceramic or the like, which allows vapors and gases to flow from chamber 96 into recess 101. Liquids remain in the chamber 96 and flow back to chamber 76. Filter 106 is located between a pair of O-rings 107 and 108. A washer 109 having a center opening engages O-ring 108. As shown in FIG. 8, a plurality of bolts 111 secure washer 109 to cap 98 and holds the filter 106 in sealing relation with cap 98.

In use, fuel heater 10 functions to heat the liquid fuel to a temperature between 105 and 100 degrees F. The heated fuel is delivered to carburetor 12 of engine 11. The liquid fuel being of a substantially constant temperature is efficiently atomized and mixed with air. The fuel-to-air mixture ratio can be effectively adjusted to provide for the maximum efficiency of an engine 11. This reduces the effect of the outside or ambient temperature of the air on the fuel-air mixture. The hot coolant from engine 11 is pumped with pump 13 to controller 24. The hot coolant flows through hose 16 and line 27 into the upper end of controller 24. Finger 42 controls the flow of the hot coolant through controller 24 to the heat exchanger or heater 10. This control is responsive to the temperature of the fuel moving to carburetor 10. As shown in FIG. 3, the fuel from the heat exchanger 10 flows around the thermostatic actuator 46. Thermostatic actuator 46 controls the position of finger 42 relative to passage 39. When the fuel is cold, spring 44 holds finger 42 away from passage 39. This allows the maximum rate of flow of coolant through heat exchanger 10. As the temperature of the fuel increases, the thermostatic actuator 46 expands and moves finger 42 up into the passage 39. This restricts the flow of hot coolant to heat exchanger 10.

As shown in FIG. 6, the hot coolant flows into the annular chamber 84 formed by collar 83. The hot coolant flows down through the chamber 67 and casing 61. The inner sleeve 62 transfers heat from the hot coolant to the fuel moving through passages 66. Ribs 64 provide large surface areas in contact with the fuel. This ensures efficient heat transfer from the ribs to the fuel. The coolant is collected in the bottom chamber formed by groove 89 and casing 61 and hose 29.

The cold liquid fuel from the fuel tank 19 enters the top of the heater 10 through connector 77 and passage 78. The fuel is supplied to the top chamber 76 which is open to all of the passages 66. When the fuel is heated, some of the liquid fuel to vaporize into a gas phase. The vapors or gases flow upwardly through holes 97 into the top chamber 96. Filter 106 allows the vapors to flow into recess 101 and to line 104 back to the fuel tank 19. Filter 106 prevents liquid fuel from flowing back to the fuel tank 19. The removal of the vapors from chamber 96 ensures that the upper and lower chambers 76 and 71 as well as passages 66 remain full of fuel. This ensures an effective and efficient transfer of heat to the liquid fuel and prevents over heating of the liquid fuel. The vapors are not delivered to carburetor 12. This prevents carburetor 12 from being starved of liquid fuel due to the vapors in the fuel line thereby eliminating vapor lock problems.

There has been shown and described one embodiment of the fuel heating system of the invention. It is understood that changes in size, materials, and parts may be made by one skilled in the art without departing from the invention. The invention is defined in the following claims.

The embodiments of the invention in which an exclusive property or privilege is claimed are defined as follows:

1. An apparatus for heating liquid fuel for an internal combustion engine having means for supplying the engine with fuel and a cooling system using a fluid to cool the engine comprising:
   a fuel heater comprising a housing having a first chamber for accommodating hot fluid from the cooling system of the engine, a second chamber for accommodating fuel, and top and bottom end members closing the second chamber, heat conducting wall means separating said first and second chambers whereby the hot fluid heats the fuel in the second chamber, a solid cylindrical core of non-heat conductive material located within the second chamber having an external wall spaced inwardly from said wall means providing passage means adjacent said wall means for the fuel in the second chamber, means connecting the core to said top and bottom end members, a cap mounted on the top member forming a third chamber between said top member and said cap, said top member having passage means connecting the second and third chambers whereby fuel vapors in the second chamber flow into the third chamber, a porous filter operable to allow fuel vapors to flow through the filter and prevent liquid fuel from flowing through the filter mounted on said cap and open to the third chamber and externally of said cap whereby said fuel vapors flow through said filter and externally of said cap and said liquid fuel remains in said third chamber, and a controller for regulating the flow of fluid from the cooling system to the heater in response to the temperature of fuel flowing out of the second chamber of the heater to the means for supplying the engine with fuel.

2. An apparatus for heating liquid fuel for an internal combustion engine having means for supplying the engine with fuel and a cooling system using a fluid to cool the engine comprising:
   a fuel heater having a first chamber for accommodating hot fluid from the cooling system of the engine, a second chamber for accommodating fuel for the engine, wall means separating the first and second chambers whereby the hot fluid heats the fuel, and a controller spaced from the heater for regulating a flow of fluid from the cooling system to the heater in response to the temperature of hot fuel flowing from the heater to the means for supplying the engine with fuel, said controller having a controller housing of non-heat conductive material having a controller chamber, tubular means having a passage connecting the controller chamber to the heater for carrying hot fluid to the first chamber of the heater, finger means movable into said passage to restrict the flow of fluid through said passage, temperature responsive actuator means connected to said finger means movable relative to said passage, means having a passage located adjacent said actuator means for carrying hot fuel from the heater to the controller, said hot fuel heating the temperature responsive actuator means whereby said actuator means moves the finger means relative to said passage in a direction to restrict the flow of fluid to said passage, and means for carrying the hot fuel from said controller to the means for supplying the engine with fuel.

3. An apparatus for heating liquid fuel for an internal combustion engine having means for supplying the engine with fuel and a cooling system using a fluid to cool the engine comprising:

a heater having a outer casing, wall means surrounded by said outer casing having a surface open to a first chamber located between said outer casing and said wall means, said first chamber accommodating hot fluid from the cooling system of the engine, means for carrying hot fluid from the cooling system to an upper portion of the first chamber, second means for carrying fluid from the lower portion of the first chamber to the cooling system, said wall means having a plurality of spaced longitudinal ribs open to a second chamber, said ribs providing passages for the fuel, a solid core of non-heat conductive material surrounded by said ribs and providing an inner wall for said passages, a base mounted on the wall means closing the lower ends of second chamber, a top member mounted on the wall means closing the top of the second chamber means mounting the core on the base and top member, means for supplying fuel to the upper portion of said second chamber, means for carrying hot fuel from the bottom of said second chamber, a cap mounted on the top member forming a third chamber, said top member having passage means connecting the second and third chambers whereby fuel vapors in the second chamber flow into the third chamber, a filter mounted on the cap open to the third chamber and externally of the cap whereby said fuel vapors flow through said filter and externally of said cap and liquid fuel remains in said second and third chambers, a controller spaced from the heater for regulating the flow of fluid from the cooling system to the heater in response to the temperature of the fuel flowing from the heater to the means for supplying the engine with fuel, said controller including a controller housing of non-heat conductive material having a controller chamber, tubular means having a passage connecting the controller chamber to the first means for carrying hot fluid to the first chamber of the heater, finger means movable into to said passage to restrict the flow of fluid through said passage, temperature response actuator means connected to said finger means movable relative to said passage, means having a passage located adjacent said actuator means for carrying the hot fuel from the heater through the controller, said hot fuel heating said actuator means whereby the actuator means moves said finger means relative to said passage in a direction to restrict the flow of fluid through said passage, and means for carrying hot fuel from said controller to the means for supplying the engine with fuel.

4. An apparatus for heating liquid fuel prior to combustion thereof in means having a cooling fluid to cool the same comprising:

a fuel heater having means for heating liquid fuel with the cooling fluid, a housing having a chamber for collecting vapors generated during the heating of the liquid fuel, filter means open to the chamber for allowing the vapors to flow from said heater and retain the liquid fuel in said heater, and means for carrying the hot fuel from the heater to the combustion means, said means for carrying hot fluid from the heater to the combustion means includes a controller separated from the heater for regulating the flow of fluid from the cooling system to the heater in response to the temperature of the fuel flowing from the heater to the combustion means, said controller having housing means of non-heat conductive material having a controller chamber, means having a passage connecting the controller chamber to the heater for carrying hot fluid to the heater, finger means movable relative to said passage to restrict the flow of fluid through said passage, temperature responsive actuator means connected to said finger means, means located adjacent said actuator means for carrying hot fuel from the heater through the controller, said hot fuel heating the temperature responsive actuator means whereby said actuator means moves the finger means into said passage in a direction to restrict the flow of fluid through said passage, and means for carrying fuel from said controller to said combustion means.

5. The apparatus of claim 1 wherein: said wall means has a plurality of inwardly directed longitudinal ribs, adjacent ribs being spaced from each other and located adjacent the external wall of the core providing said passage means for the fuel.

6. The apparatus of claim 1 wherein: said cap has a recess open to the third chamber and a passage connected to the recess and externally of the cap, said filter being located in said recess, and means holding the filter in said recess.

7. The apparatus of claim 1 wherein: said housing has an outer casing, said wall means being surrounded by said outer casing, said wall means being surrounded by said outer casing and having a surface open to the first chamber, first means for carrying hot fluid to an upper portion of the first chamber, second means for carrying fluid from a lower portion of said first chamber to said cooling system, said wall means having a plurality of laterally spaced longitudinal ribs located adjacent the external wall of the core providing said passage means for the fuel, said fuel being heated as it flows in said passage means.

8. The apparatus of claim 1 wherein: said controller includes a controller housing located externally of said bottom end member having a controller chamber, means having a passage connecting the controller chamber to the controller heater for carrying hot fluid to the first chamber of the heater, means movable relative to said passage to restrict the flow of fluid through said passage, a temperature responsive actuator connected to said means movable relative to said passage, means located adjacent said actuator for carrying hot fuel from the heater through the controller, said hot fuel heating the temperature responsive actuator whereby said actuator moves the means movable relative to said passage in a direction to restrict the flow of fluid through said passage, and means for carrying fuel from said controller to the means for supplying the engine with fuel.

9. The apparatus of claim 8 wherein: said controller housing is made of non-heat conductive material, said means movable relative to said passage and actuator being located within the controller chamber.

10. The apparatus of claim 9 wherein: said actuator has a body, material located within the body that expands and contracts is response to changes in temperature, and a piston movably mounted on the body and engageable with said material and means movable relative to said passage, a cup-shaped heat conductive member located about said body, said cup-shaped member having an outer groove forming a passage for hot fuel, said hot fuel heating said cup-shaped member, body, and material within the body to move said piston thereby move said means movable relative to said passage to control the flow of fluid through said passage.

11. The apparatus of claim 10 wherein: said means movable relative to said passage includes finger means adapted to move into said passage in response to an increase in the temperature of the fuel, and biasing means moving the finger out of said passage.

12. The apparatus of claim 2 wherein: said heater has cylindrical wall means having a plurality of inwardly directed longitudinal ribs, and opposite ends, end members mounted on said opposite ends, adjacent ribs being spaced from each other providing passages for the fuel, said wall means being exposed to said first chamber, said ribs being exposed to said second chamber, a solid cylindrical core of non-heat conductive material surrounded by said ribs and means mounting the core on the end members.

13. The apparatus of claim 2 wherein: said heater includes a top member closing said second chamber, a cap mounted on the top member providing a third chamber between said top member and the cap, said top member having passage means connecting the second and third chambers whereby vapors in the second chamber flow into the third chamber, and filter means mounted on said cap and open to the third chamber and externally of said cap whereby said vapors flow through said filter means and externally of said cap and said fuel remains in said third chamber.

14. The apparatus of claim 13 wherein: said cap has a recess open to the third chamber and a passage connected to the recess and externally of the cap, said filter means being located in said recess, and means holding the filter means in said recess.

15. The apparatus of claim 2 wherein: said heater has an outer casing, wall means surrounded by said outer casing and having a surface open to the first chamber, first means for carrying hot fluid to an upper portion of the first chamber, second means for carrying fluid from the lower portion of the first chamber to said cooling system, said wall means having a plurality of spaced longitudinal ribs open to the second chamber providing passages for the fuel, said fuel being heated as it flows in said passages, a core of non-heat conductive material surrounded by said ribs, a base mounted on the wall means closing the lower end of the second chamber, a top member mounted on the wall means closing the top of the second chamber and means mounting the core on said base and top member.

16. The apparatus of claim 15 including: a cap mounted on the top member forming a third chamber, said top member having passage means connecting the second and third chambers whereby vapors of the second chamber flow into the third chamber, and a filter mounted on the cap open to the third chamber and externally of the cap whereby said vapors flow through said filter and externally of said cap and said fuel remains in said second and third chambers.

17. The apparatus of claim 2 wherein: said actuator means has a body, material located within the body that expands and contracts in response to changes in temperature, and a piston movably mounted on the body and engageable with said material and said finger means, a cup-shaped heat conductive member located about said body, said cup-shaped member having a groove forming a passage for hot fuel, said hot fuel heating said cup-shaped member, body, and material within the body to move said piston thereby moving said finger means relative to said passage.

18. The apparatus of claim 3 wherein: said cap has a recess open to the third chamber and a passage connected to the recess and externally of the cap, said filter being located in said recess, and means holding the filter in said recess.

19. The apparatus of claim 3 wherein: said actuator means has a body, material located in the body that expands and contracts to changes in temperature, a piston movably mounted on the body and engageable with said material and said finger means, a cup-shaped heat conductive member located about said body, said cup-shaped member having an outer groove forming a passage for hot fuel, said hot fuel heating said cup-shaped member, body, and material within the body to move said piston thereby move said finger means relative to said passage to control the flow of fluid through said passage.

20. The apparatus of claim 4 wherein: said housing has a first chamber for accommodating the fluid, a second chamber for the liquid fuel, and passage means connecting the second chamber with the chamber for collecting vapors.

21. The apparatus of claim 20 wherein: said housing includes a cap open to said chamber, said cap having a recess open to the chamber, and a passage connecting the recess externally of the housing, said filter being located in said recess, and means retaining said filter means in said recess.

22. The apparatus of claim 4 wherein: said actuator has a body, material located with the body that expands and contracts in response to changes in temperature, and a piston movably mounted on the body and engageable with said material and means movable relative to said passage, a cup-shaped heat conductive member located about said body, said cup-shaped member having an outer groove forming a passage for hot fuel, said hot fuel heating said cup-shaped member, body, and material within the body to move said piston thereby move said means movable relative to said passage to control the flow of fluid through said passage.

23. The apparatus of claim 4 including: biasing means for moving the finger means out of said passage.

* * * * *